(12) United States Patent
Nagai et al.

(10) Patent No.: US 7,212,360 B2
(45) Date of Patent: May 1, 2007

(54) INFORMATION PROCESSING EQUIPMENT AND DATA TRANSFER METHOD

(75) Inventors: Hiromasa Nagai, Chiba (JP); Masahiro Fushida, Kanagawa (JP)

(73) Assignee: Sony Corporation, Tokyo (JP)

( * ) Notice: Subject to any disclaimer, the term of this patent is extended or adjusted under 35 U.S.C. 154(b) by 214 days.

(21) Appl. No.: 10/991,424

(22) Filed: Nov. 19, 2004

(65) Prior Publication Data

US 2005/0154936 A1    Jul. 14, 2005

(30) Foreign Application Priority Data

Nov. 28, 2003 (JP) ............................. 2003-398729

(51) Int. Cl.
  *G11B 5/00* (2006.01)
(52) U.S. Cl. ........................................................ 360/6
(58) Field of Classification Search .................... 360/6, 360/69, 75; 702/62; 705/30; 709/203; 340/870.03; 324/157; 386/46; 348/208.4; 379/106.07
  See application file for complete search history.

(56) References Cited

U.S. PATENT DOCUMENTS

| 4,161,720 | A | * | 7/1979 | Bogacki | ................ | 340/870.03 |
|---|---|---|---|---|---|---|
| 4,291,375 | A | * | 9/1981 | Wolf | ........................... | 702/62 |
| 4,298,839 | A | * | 11/1981 | Johnston | ..................... | 324/157 |
| 5,197,095 | A | * | 3/1993 | Bonnet et al. | ......... | 379/106.07 |
| 6,148,292 | A | * | 11/2000 | Reisinger et al. | ............. | 705/30 |
| 6,590,607 | B1 | * | 7/2003 | Taussig | ................... | 348/208.4 |
| 2002/0161536 | A1 | * | 10/2002 | Suh et al. | ..................... | 702/62 |
| 2003/0225830 | A1 | * | 12/2003 | Kataoka et al. | ............. | 709/203 |
| 2004/0146274 | A1 | * | 7/2004 | Ishibashi | ..................... | 386/46 |

\* cited by examiner

*Primary Examiner*—Fred F. Tzeng
(74) *Attorney, Agent, or Firm*—Oblon, Spivak, McClelland, Maier & Neustadt, P.C.

(57) ABSTRACT

Provided is information processing equipment capable of efficiently performing data transfer restarted after it is suspended because a possibility of being affected by an impact derived from dropping or the like is predicted or detected. During transfer of data from an HDD, an amount-of-transferred data meter counts in real time the number of sectors from which data has been transferred. An acceleration sensor detects acceleration applied to the equipment. A sector that may be affected by an impact derived from dropping or the like is identified based on the number of sectors indicated with a result of the measurement obtained when the detected acceleration value exceeds a threshold. Information on the sector is written in a register. When the data transfer is restarted, it is restarted with data stored in the sector that is recorded in the register.

6 Claims, 13 Drawing Sheets

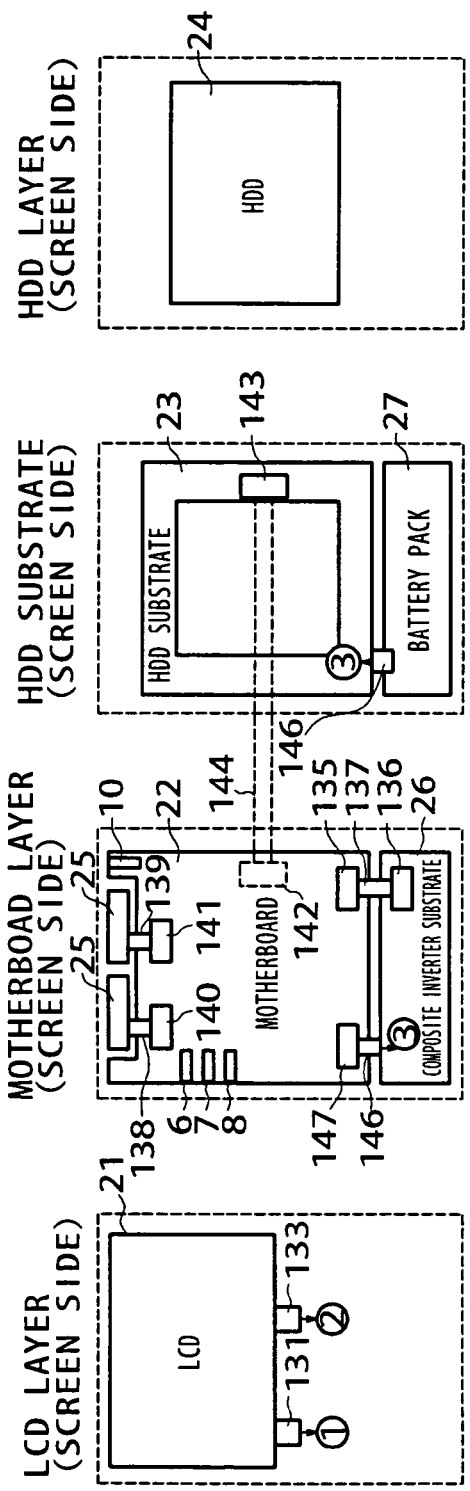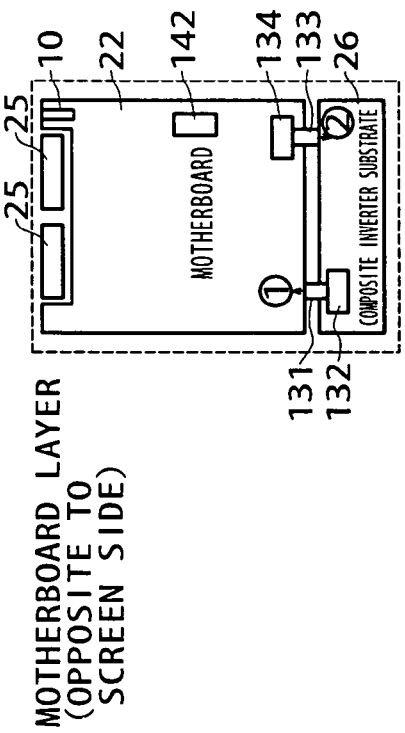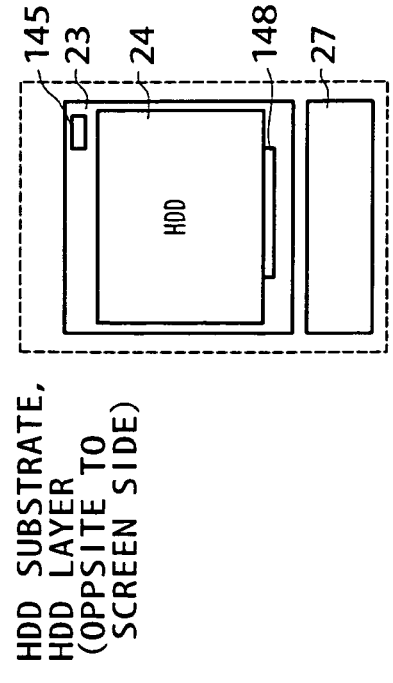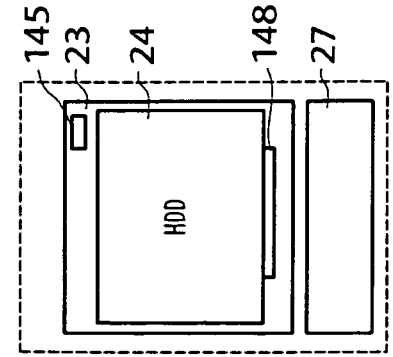

INFORMATION PROCESSING EQUIPMENT AND DATA TRANSFER METHOD

BACKGROUND OF THE INVENTION

1. Field of the Invention

The present invention relates to information processing equipment having a large-capacity data recorder such as a hard disk drive incorporated therein. More particularly, the present invention is related to information processing equipment having portability and having a possibility of undergoing a dropping impact or the like during data transfer from the data recording unit, and a data transfer method to be implemented in the image processing equipment.

2. Description of the Related Art

In recent years, the application field of a hard disk drive (hereinafter a HDD) has no longer been confined to the field of personal computers but has expanded because the hard disk drive has come to be incorporated in portable audiovisual equipment or car navigation systems. The HDD being incorporated in the equipment is likely to highly frequently undergo a dropping impact or the like. It is therefore necessary to take measures for protection against an impact.

The countermeasures for protecting an HDD against an impact include a method of using, for example, a gyrosensor to predict a possibility of undergoing an impact derived from dropping or the like, suspending data transfer to or from the HDD before actually undergoing an impact, and withdrawing a magnetic head to a shelter zone. Thus, data to be read or written from or in the HDD is protected, and destruction of the surface of a magnetic head and a platter is prevented (refer to, for example, Japanese Unexamined Patent Application Publication No. 06-203505 and No. 2003-014776.

However, restarting data transfer after suspending it leads to deterioration of efficiency in data transfer because all data items including data in a sector whose transfer has been completed prior to actual application of an impact must be transferred. In particular, if data transfer is suspended due to an impact occurring during continuous reading of a large amount of data such as a motion picture stream, the efficiency in data transfer may be deteriorated considerably.

SUMMARY OF THE INVENTION

The present invention attempts to break through the foregoing situation. An object of the present invention is to provide information processing equipment and a data transfer method capable of efficiently achieving data transfer restarted after it is suspended by predicting or detecting a possibility of undergoing an impact derived from dropping or the like.

According to the present invention, if an error occurs due to an impact derived from dropping or the like during data transfer, the data transfer is restarted with a block that may have been affected by the impact. Consequently, since blocks preceding the block need not be retransferred, the efficiency in data transfer improves.

Moreover, according to the present invention, the next data transfer and subsequent data transfers can be controlled based on an optimal threshold permitting high-precision assessment of a possibility that a data recorder may be affected by an impact derived from dropping or the like.

According to information processing equipment and a data transfer method in which the present invention is implemented, if an error occurs due to an adverse effect of an impact derived from dropping or the like during data transfer, the data transfer is restarted with a block that may have been affected by the impact. Consequently, since blocks preceding the block need not be retransferred, the efficiency in data transfer improves.

BRIEF DESCRIPTION OF THE DRAWINGS

FIG. 13A is a plan view showing an LCD layer of the portable HDD video playback equipment shown in FIG. 1;

FIG. 13B includes plan views showing a motherboard layer (screen side) and an HDD substrate layer (screen side) of the portable HDD video playback equipment shown in FIG. 1;

FIG. 13C is a plan view showing an HDD layer (screen side) of the portable HDD video playback equipment shown in FIG. 1;

FIG. 13D is a plan view showing the motherboard layer (opposite to the screen side) of the portable HDD video playback equipment shown in FIG. 1;

FIG. 13E is a plan view showing the HDD substrate layer and HDD layer (opposite to the screen side) of the portable HDD video playback equipment shown in FIG. 1;

DESCRIPTION OF THE PREFERRED EMBODIMENTS

Figure 1:
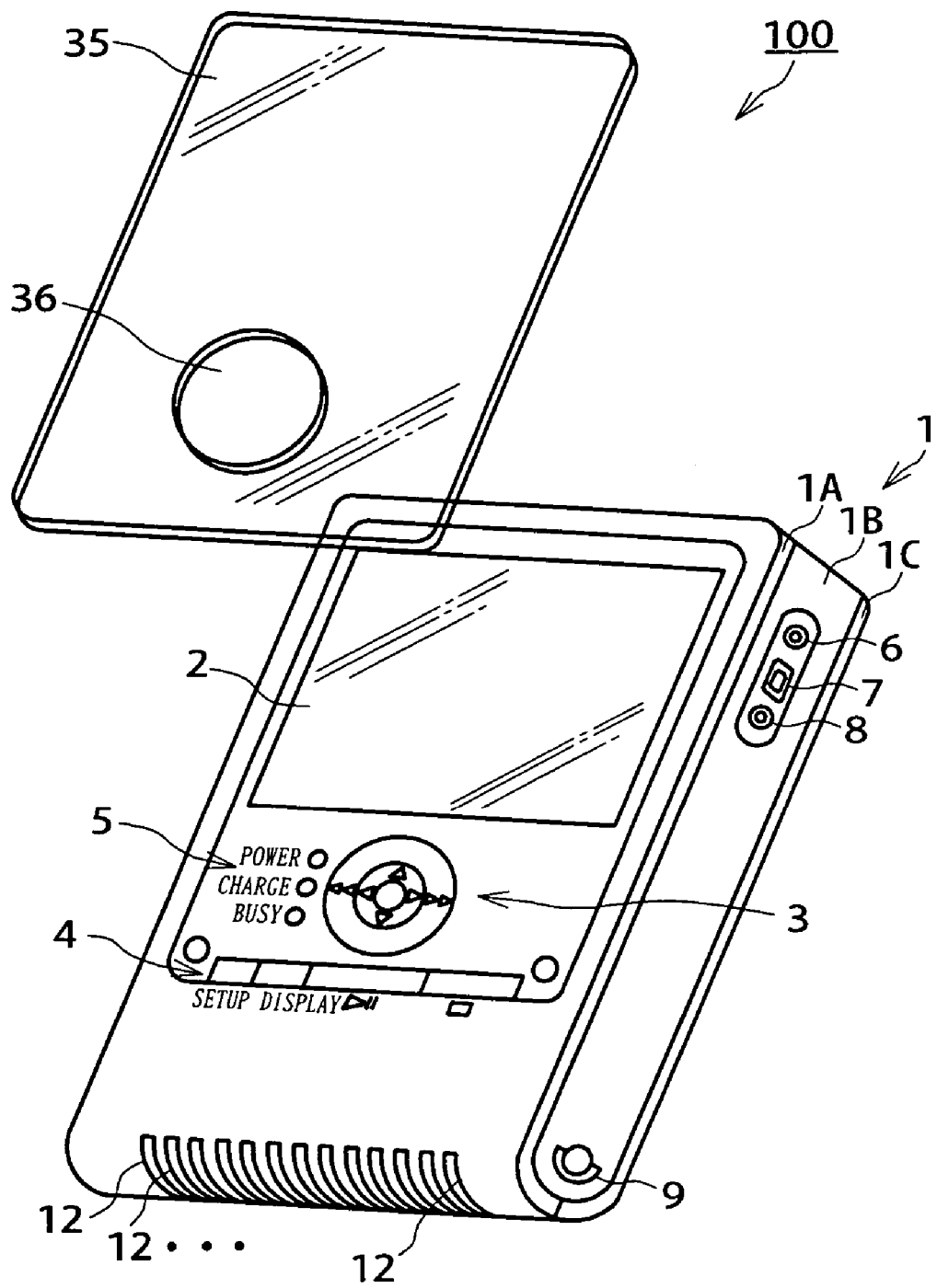
FIG. 1 is a perspective view showing the appearance of portable HDD video playback equipment in accordance with an embodiment of the present invention.

Referring to the drawings, an embodiment of the present invention will be described below.

Figure 2:
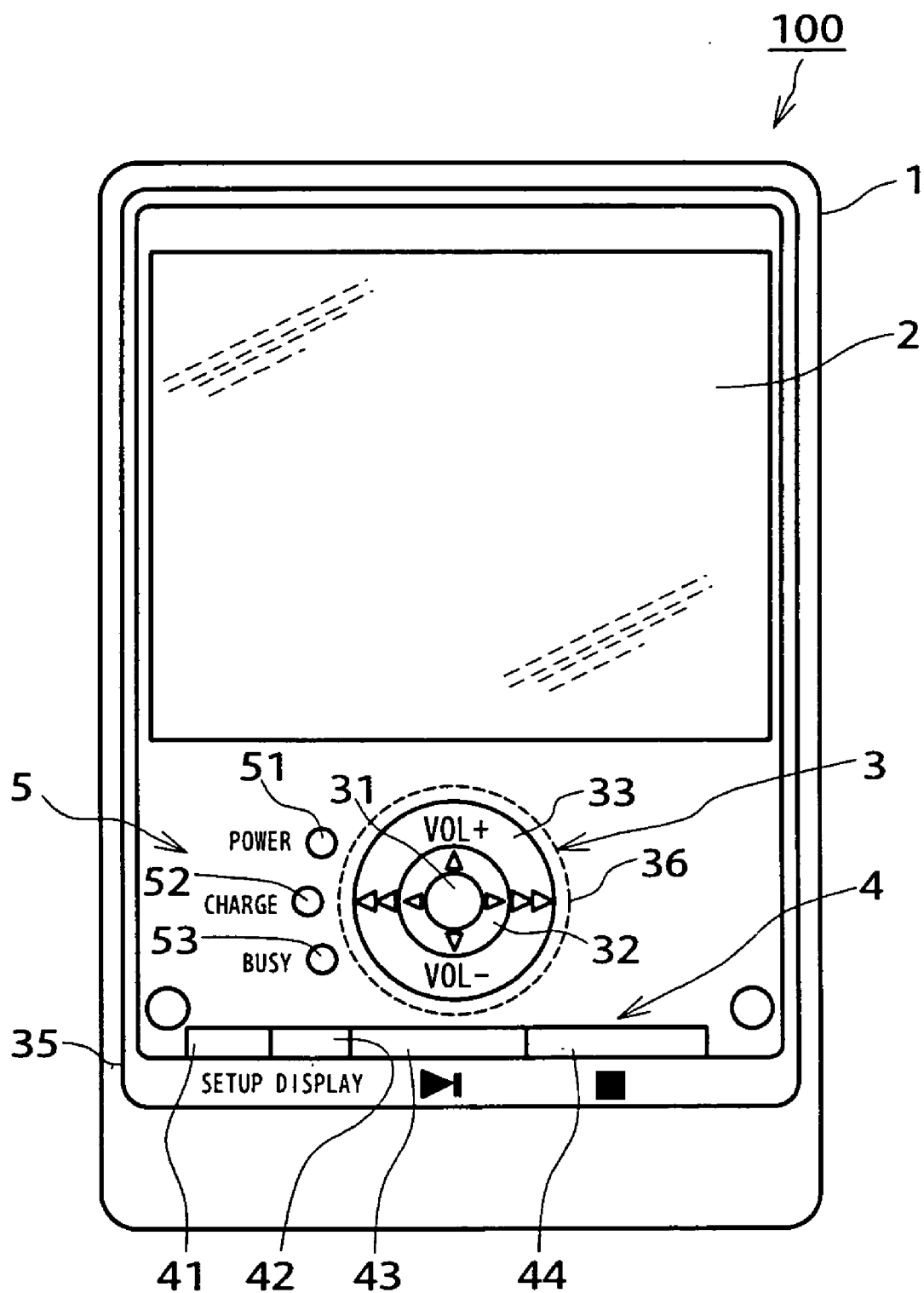
FIG. 2 is a front plan view of the portable HDD video playback equipment shown in FIG. 1.
Figure 3:
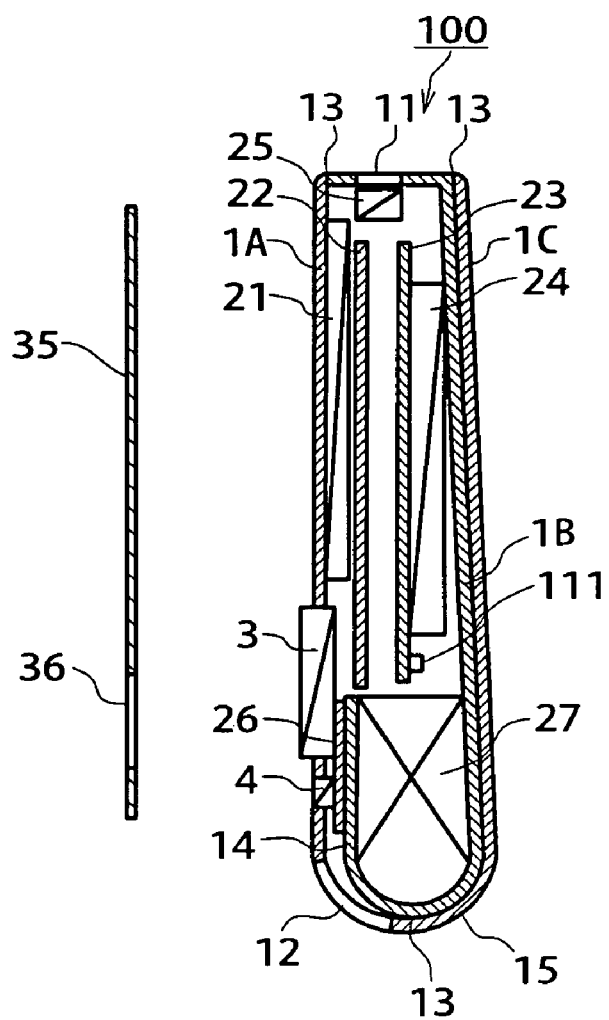
FIG. 3 is a sectional view of the portable HDD video playback equipment shown in FIG. 1.
Figure 4:
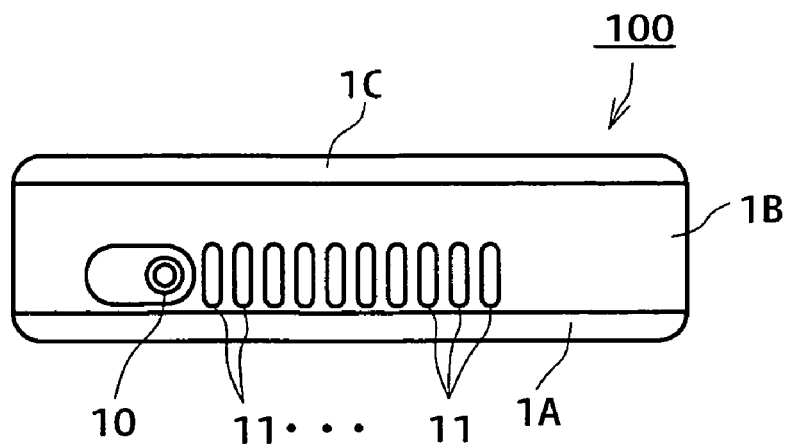
FIG. 4 is a top plan view of the portable HDD video playback equipment shown in FIG. 1.

FIG. 1 is a perspective view showing the appearance of portable HDD video playback equipment in accordance with an embodiment of the present invention. FIG. 2 is a front plan view of the portable HDD video playback equipment 100, and FIG. 3 is a sectional view thereof. FIG. 4 is a top plan view of the portable HDD video playback equipment 100.

The portable HDD video playback equipment 100 includes a housing 1 whose size permits a user to hold the housing 1 with one hand. An LCD screen 2, a key operating unit 3, operation buttons 4, and light-emitting diode (LED) indicators 5 are disposed on the front side of the housing 1.

The key operating unit 3 includes, as shown in FIG. 2, three keys 31, 32, and 33 that are mutually concentric and can be manipulated independently of one another. The key located in the center is the Enter key 31 to be used to designate selection or execution. The key located outside the Enter key 31 is the menu selection-related key 32 to be used to select a menu option. The outermost key is the playback-related key 33 to be used for reproduction.

When any of the upward, downward, rightward, and leftward positions on the menu selection-related key 32 or playback-related key 33 with the Enter key 31 as a center is pressed, an associated key command is issued. Key commands to be issued responsively to the press of the menu selection-related key 32 include upward, downward, rightward, and leftward shifts of the position of a highlight that are effected in order to select a menu option in any of various menu screen images to be described later. Key commands to be issued responsively to the press of the playback-related key 33 include quick playback, return, and increase or decrease in an audio volume.

The operation buttons 4 include a Setup button 41 to be used to invoke various designation screen images, a Display button 42 to be used to present the elapsed (remaining) time for reproduction of a video stream, a Playback button 43 to be used to instruct restart of reproduction or suspension thereof, and a Stop button 44 to be used to instruct discontinuation of reproduction.

The LED indicators 5 include a power-up indicator 51 signifying a power-up state, a charge indicator 52 signifying that a battery is being charged, and a busy indicator 53 signifying a busy state in which a stream is being transferred.

A DCIN jack 6 via which the equipment is plugged into a DC power supply, a universal serial bus (USB) connector 7 via which the equipment becomes USB-compatible, and an AVOUT jack 8 via which the equipment transmits audio and video signals are disposed on one flank of the housing 1. Moreover, a strap eyelet 9 is formed. A Power key (not shown) to be used to turn on or off the main power supply of the equipment is disposed on the other flank of the housing 1. A headphone jack 10 and numerous slit-like vents 11 are, as shown in FIG. 4, juxtaposed on the top of the housing 1. Numerous slit-like intake ports 12 are juxtaposed on the bottom of the housing 1.

Figure 5:
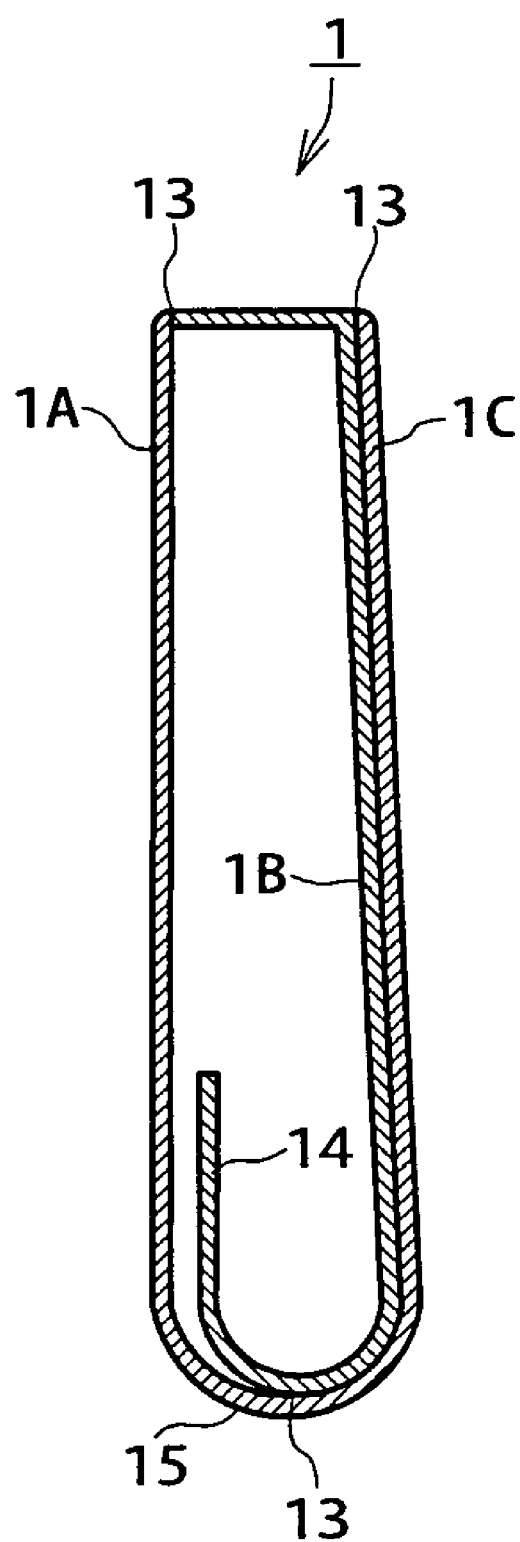
FIG. 5 shows a housing 1 shown in the sectional view of FIG. 3.

FIG. 5 shows only the housing 1 shown in the sectional view of FIG. 3. As shown in the drawing, the housing 1 includes a front housing member 1A, an intermediate housing member 1B, and a rear housing member 1C. The front housing member 1A and rear housing member 1C realize mainly the face and back of the armor of the portable HDD video playback equipment 100. The intermediate housing member 1B realizes the top and right and left flanks of the armor of the portable HDD video playback equipment 100. The portion of the intermediate housing member serving as the top of the housing 1 has the vents 11 juxtaposed as shown in FIG. 4. The front housing member 1A and rear housing member 1C are joined with the intermediate housing member 1B between them. A portion 15 having a semicircular section realizes the bottom of the housing 1. The portion 15 having the semicircular section is realized by directly joining the front housing member 1A and rear housing member 1C. Moreover, the intake ports 12 are bored in the section of the front housing member 1A serving as part of the portion 15 having the semicircular section. The lower part of the intermediate housing member 1B is curved to have a U-shaped section along the portion 15 that has the semicircular section and serves as the bottom of the housing 1. The curved part of the intermediate housing member 1B shall be called a curved portion 14.

A transparent acrylic cover 35 capable of shielding the LCD screen 2 and operation buttons 4 can be attached to or detached from the front side of the housing 1. The acrylic cover 35 protects the LCD screen 2 from flawing or adhesion of dust. The acrylic cover 35 has an opening 36 through which the key operating unit 3 is bared. The key operating unit 3 can be manipulated with the acrylic cover 35 attached.

Next, the internal structure of the portable HDD video playback equipment 100 will be described below.

As shown in FIG. 3, the components accommodated by the housing 1 are divided into a group of components stowed in the upper part of the housing that lies upwards in the height direction of the portable HDD video playback equipment 100 and a group of components stowed in the lower part thereof. The group of components stowed in the upper part includes an LCD 21 with a backlight, a motherboard 22, an HDD substrate 23, an HDD 24, and cooling fans 25. The group of components stowed in the lower part includes a composite inverter substrate 26 and a battery pack 27. The LCD 21, motherboard 22, and HDD 24 are major heat sources in the portable HDD video playback equipment 100. When the amounts of dissipated heat are compared with one another, the amount of heat dissipated from the LCD 21 is larger than that from the motherboard 22, and the amount of heat dissipated from the motherboard 22 is larger than that from the HDD 24. Moreover, the HDD substrate 23 is provided with an acceleration sensor 111 that detects or predicts an impact derived from dropping or the like.

The components that are the major heat sources are arranged orderly from the front side of the portable HDD video playback equipment 100 to the rear side thereof so that the component dissipating the largest amount of heat will be disposed on the front side. Owing to the arrangement, compared with the other ways of arranging the components, heating of the rear housing member 1C can be minimized to the greatest possible extent. The portable HDD video playback equipment 100 is designed so that a user can enjoy a video while holding it with his/her hand. While the user is enjoying a video, the user touches the rear housing member 1C over the widest area. Since a rise in the temperature of the rear housing member 1C can be minimized, the degree of the user's discomfort derived from heat can be alleviated.

Moreover, heat in the housing 1 is released to outside along with an air current circulated from the intake ports 12 bored in the bottom of the housing 1 to the vents 11 bored in the top of the housing 1 as shown in FIG. 4 by the cooling fans 25 disposed in the uppermost part of the housing 1. Consequently, the heat sources in the housing 1 are efficiently cooled. The problem of heat conduction to the user is further alleviated.

The battery pack 27 serving as a power supply is disposed to be enclosed with the internal surface of the U-shaped curved portion 14 of the intermediate housing member 1B.

Moreover, the composite inverter substrate 26 is borne on the distal flat surface of the curved portion 14 on the front side (screen side) of the equipment. Namely, the battery pack 27 and composite inverter substrate 26 are separated from each other by the curved portion 14 of the intermediate housing member 1B. What is referred to as the composite inverter substrate 26 is a substrate on which components relevant to the motions of the operation buttons 4 and key operating unit 3 and an inverter for driving the backlight of the LCD 21 are mounted. Since the battery pack 27 and composite inverter substrate 26 are separated from each other by the curved portion 14 of the intermediate housing member 1B, an event that the composite inverter substrate 26 is affected by liquid leakage from the battery pack 27 can be avoided. Moreover, an event that pressure exerted in manipulating the key operating unit 3 is applied directly to the battery pack 27 can be avoided in order to protect the battery pack 7.

Incidentally, since the battery pack 27 does not serve as a heat source, although the battery pack is placed on the lower part of the internal surface of the rear housing member that comes into closest contact with a user's hand, no problem occurs. Moreover, the battery pack 27 has the largest specific gravity and the largest weight among all the components in the housing 1. Therefore, when the battery pack 27 is disposed in the lowermost part of the housing 1, a user who is holding the portable HDD video playback equipment 100 while enjoying a video will have a good sense of stability.

Figure 12:
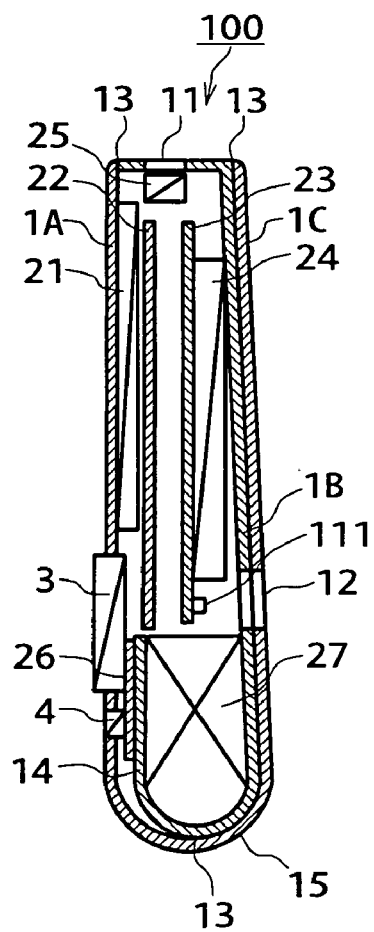
FIG. 12 is a sectional view showing portable HDD video playback equipment in accordance with another embodiment of the present invention.

Incidentally, the portable HDD video playback equipment 100 of the present embodiment has, as shown in FIG. 3, the intake ports 12 bored in the bottom of the housing 1. Alternatively, as shown in FIG. 12, the intake ports 12 may be located immediately above the battery pack 27 on the rear side of the housing 1.

FIG. 13A to FIG. 13E are plan views showing layer by layer the internal structure of the portable HDD video playback equipment 100. The backlight of the LCD 21 is connected to a connector 132 fixed on the screen-side flank of the composite inverter substrate 26 over connection wiring 131. Signals required for lighting and controlling the backlight are transmitted from the composite inverter substrate 26 to the backlight of the LCD 21 over the connection wiring 131. Moreover, the LCD 21 is connected to a connector 134 fixed to the flank of the motherboard 22 opposite to the screen-side flank thereof over connection wiring 133. Signals required for the LCD 21 are transmitted from the motherboard 22 over the connection wiring 133. The motherboard 22 and composite inverter substrate 26 are electrically connected to each other via the connectors 135 and 136, which are fixed to the screen-side flanks thereof, over connection wiring 137 linking the connectors 135 and 136. The motherboard 22 and composite inverter substrate 26 communicate mutually necessary signals to each other. Two connectors 140 and 141 to which one ends of connection wirings 138 and 139 over which driving signals are transmitted to the two cooling fans 25 are formed on the screen-side flank of the motherboard 22. The motherboard 22 and HDD substrate 23 can communicate with each other over connection wiring 144 linking a connector 142 formed on the flank of the motherboard 22 opposite to the screen-side flank thereof and a connector 143 formed on the screen-side flank of the HDD substrate 23. The motherboard 22 has the DC (direct current) IN jack 6, the USB connector 7, the AVOUT jack 8 via which audio and video signals are transferred, and the headphone jack 10. The HDD substrate 23 has a switch 145 for use in resetting the system. Connection wiring 146 led out from the battery pack 27 is routed to a connector 147 formed on the screen-side flank of the motherboard 22. The HDD 24 is electrically connected to the HDD substrate 23 via a connector 148 formed on the flank of the HDD substrate 23 opposite to the screen-side flank thereof.

Figure 6:
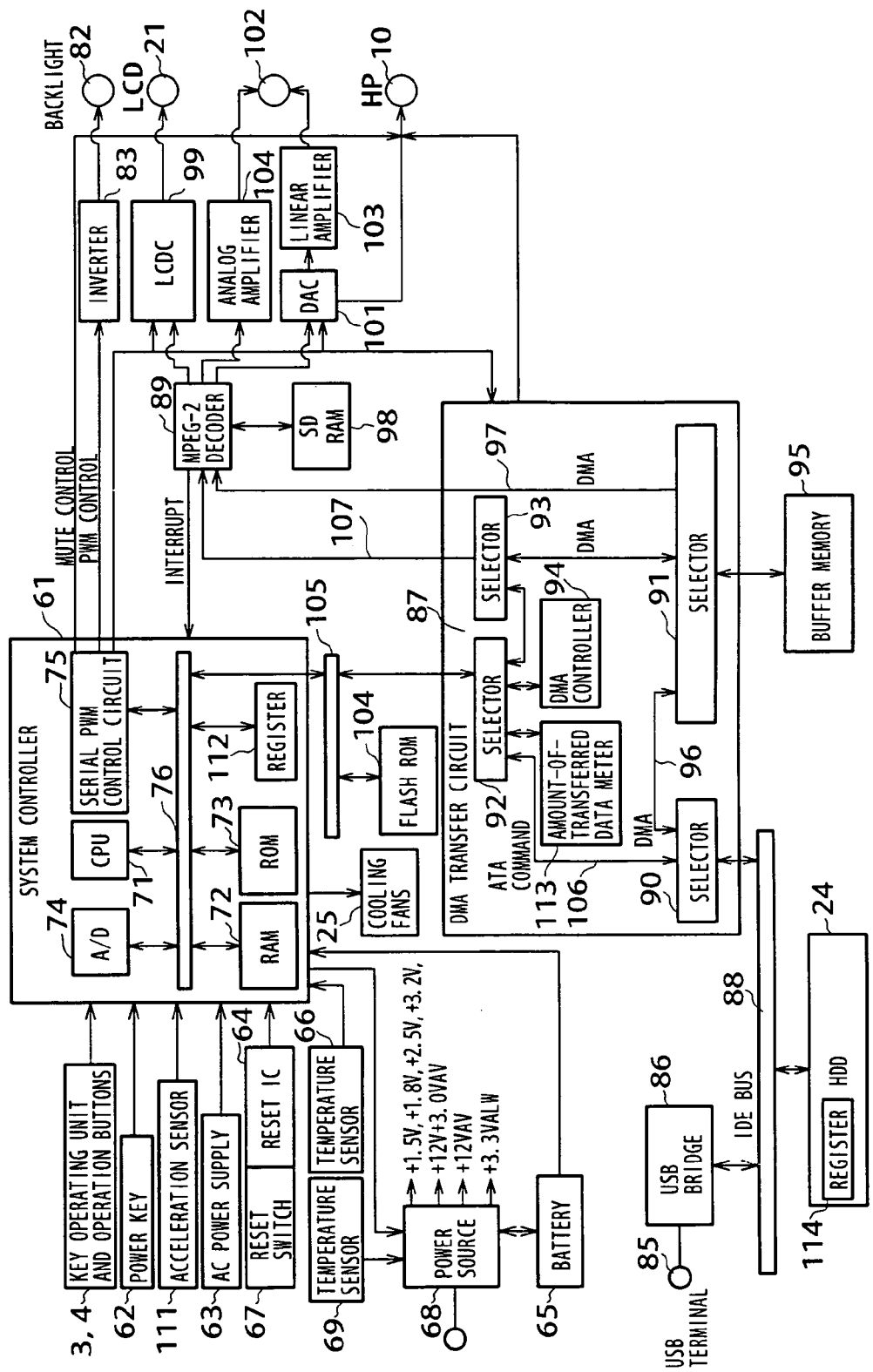
FIG. 6 shows the arrangement of circuits mounted on a motherboard.

Next, the electrical configuration of the portable HDD video playback equipment 100 will be described in conjunction with FIG. 6. FIG. 6 shows mainly the arrangement of circuits mounted on the motherboard 22.

In the drawing, a system controller 61 monitors the manipulations performed on the key operating unit 3 and operation buttons 4, the manipulation performed on the Power key 62, the connection of an alternating-current power supply 63 (detection of an alternating current), an output of a reset IC 64, a voltage at the battery 65, an output of a temperature sensor 66, and an output of an acceleration sensor 111. The system controller 61 executes processing according to the results of the monitoring. The reset IC 64 is an IC that generates a reset signal when a reset switch 67 is manipulated.

When the system controller 61 senses that the Power key 62 is pressed, the system controller 61 starts up the system and initializes devices so that the devices will be ready to act. Moreover, the system controller 61 extends control to light the power-up indicator 51. While the system is in operation, if the system controller 61 senses that the Power key 62 is pressed, the system controller 61 terminates the system.

In response to a reset signal sent from the reset IC 64, the system controller 61 resets, that is, terminates the system and then restarts the system.

The system controller 61 controls the power supply circuit 68 when sensing the connection of the ac power supply 63 (detection of an alternating current), and then controls charging of the battery 65. Based on an output of the temperature sensor 69 disposed near the power supply circuit 68, for example, when a high temperature equal to or higher than a set temperature is detected, the power supply circuit 68 is automatically turned off.

The system controller 61 calculates a remaining battery capacity of the battery 65 according to the result of monitoring the voltage at the battery, and controls the indication of the remaining battery capacity on the screen.

The system controller 61 controls the revolving speed of the cooling fans 25 according to the output of the temperature sensor 66. In other words, the system controller 61 extends control so as to raise a cooling ability proportionally to a rise in temperature.

Moreover, the system controller 61 monitors the manipulations performed on the key operating unit 3 and operation buttons 4 so as to handle an event associated with the kind of manipulated key.

The system controller 61 includes a central processing unit (CPU) 71, a random access memory (RAM) 72, a read-only memory (ROM) 73, an A/D conversion circuit 74, a serial pulse width modulation (PWM) control circuit 75, and a register 112 that are interconnected over a bus 76. The CPU 71 uses the RAM 72 as a work area to perform various kinds of arithmetic and logic operations or extend various kinds of control according to firmware stored in the ROM 73. Held in the register 112 are the largest value assumed by an output of the acceleration sensor 111, a threshold based on which the largest sensor output value is assessed, a retransfer flag, and information on a sector that may be affected by an impact derived from dropping or the like.

The A/D conversion circuit 74 converts an analog value, which represents the result of monitoring the manipulations performed on the key operating unit 3 and operation buttons 4, the manipulation performed on the Power key 62, the connection of an ac power supply (detection of an alternating current) 63, an output of the reset IC 64, the voltage at the battery 65, or the output of the temperature sensor 66, into a digital value. The serial PWM control circuit 75 transfers a PWM signal, with which muting for the headphone 81 or the luminance of a backlight 82 of the LCD 21 is controlled, to an inverter 83.

A USB bridge 86 to which a USB terminal 85 is connected, the HDD 24, and a direct memory access (DMA) transfer circuit 87 are interconnected over an integrated drive electronics (IDE) bus 88. Data including a video stream transferred from a personal computer (PC) that is plugged into the USB terminal 85 is stored in the HDD 24 via the USB bridge 86 over the IDE bus 88.

The DMA transfer circuit 87 is a circuit for transferring data read from the HDD 24 to a Moving Picture Coding Experts Group (MPEG)-2 decoder 89. The DMA transfer circuit 87 includes four selectors 90, 91, 92, and 93 and a DMA controller 94. The first selector 90 is a selector for selecting data on the IDE bus 88. In response to an AT Attachment (ATA) command used to access the HDD 24, the system controller 61 connects the DMA transfer circuit 87 onto the IDE bus 88. The first selector 90 is connected to the second selector 91, which is connected to a buffer memory 95, over a first DMA transmission line 96. Consequently, data sampled from the IDE bus 88 by the first selector 90 is transferred to the buffer memory 95 via the second selector 91 over the first DMA transmission line 96.

During data transfer from the HDD 24 to the buffer memory 95, the system controller 61 controls the timing of issuing an ATA command to the first selector 90 so that data will be intermittently read from the HDD 24. Specifically, for example, the system controller 61 issues an ATA command to the first selector 90 so that data will be read from the HDD 24 in units of a video stream that covers a predetermined reproduction time, and transferred to the buffer memory 95, and so that when the buffer memory 95 runs out of data, a video stream covering the next reproduction time will be read from the HDD 24. Consequently, the HDD 24 is intermittently accessed, and the amount of heat dissipated from the HDD 24 and power consumed by the HDD 24 can be minimized.

Data including videos stored in the buffer memory 95 is read by the second selector 91 when a video stream covering a predetermined reproduction time is stored in the buffer memory 95. The read data is transferred to the MPEG-2 decoder 89 over a second DMA transfer line 97 linking the second selector 91 and MPEG-2 decoder 89. The MPEG-2 decoder 89 is a circuit for decoding by hardware a video stream encoded according to the MPEG-2 standard. An SDRAM 98 is a randomly accessible memory that is used as a work area by the MPEG-2 decoder 89.

Video data contained in an output of the MPEG-2 decoder 89 is transferred to an LCD controller 99. The LCD controller 99 controls drive of the LCD 21, whereby a video is reproduced. On the other hand, audio data sent from the MPEG-2 decoder 89 is converted into an analog signal by a D/A converter 101, and then transferred to a headphone plugged into the headphone terminal 10. Moreover, an external television or the like can be plugged into the AVOUT terminal 102. When the external television is plugged into the AVOUT terminal 102, an analog signal sent from the D/A converter 101 is amplified to a required level by a linear amplifier 103.

The third selector 92 included in the DMA transfer circuit 87 communicates with a bus 105 over which the system controller 61 and a flash ROM 104 are interconnected. The third selector 92 samples an ATA command, which is issued from the system controller 61, from the bus 105, and notifies the first selector 90 over a control line 106 of the fact that the ATA command is sampled.

As read-only data, data including bitmaps and character codes that are the fundamentals of a title list, a menu, and a designation screen image is stored in the HDD 24. When the system controller 61 reads any of the bitmaps and character codes from the HDD 24, the system controller 61 notifies the DMA controller 94 via the third selector 92 of the fact. In response to the notification, the DMA controller 94 validates the first DMA transmission line 96 linking the third selector 92 and second selector 91. Moreover, the DMA controller 94 controls the fourth selector 93 to validate the third DMA transmission line 107 linking the second selector 91 and MPEG-2 decoder 89.

The character code read from the HDD 24 and held together with the bitmap in the buffer memory 95 is transferred to the system controller 61 via the second and third selectors 91 and 92 over the bus 105. The system controller 61 reads the bitmap associated with the character code from the flash ROM 104, and returns it to the third selector 92. The DMA controller 94 transfers the bitmap associated with the character code returned from the system controller 61 to the fourth selector 93 via the third selector 92. The bitmap is synthesized with the bitmap read from the buffer memory 95 via the second selector 91, and then transferred to the MPEG-2 decoder 89.

The third DMA transmission line 107 has a larger bus width than the second DMA transmission line 97 because the third DMA transmission line 107 is used to transmit a bitmap. For example, the second DMA transmission line 97 includes eight data lines and four control lines, while the third DMA transmission line 107 includes sixteen data lines, twenty-four address lines, and three control lines. This is intended not to cause a large difference in a user-sensible speed between reproduction of a video stream and reproduction of a bitmap.

Data transfer from the HDD 24 is achieved by transferring data from every group of sectors, which includes a predetermined number of sectors, during one transfer. Moreover, the DMA transfer circuit 87 includes an amount-of-transferred data meter 113 that counts the number of sectors, which are included the HDD 24 and from which data is transferred to the buffer memory 95, as an amount of transferred data and that notifies the system controller 61 of the number of sectors.

The system controller 61 reads information preserved in the register 112 and checks the largest value assumed by an output of the acceleration sensor to see if of the largest sensor output value exceeds a threshold. If the largest sensor output value exceeds the threshold, the system controller 61 checks the count value, which is provided by the amount-of-transferred data meter 113 and signifies the number of sectors, to identify a sector that may be affected by an impact derived from dropping or the like. The system controller 61 then writes information on the sector in the register 112 and sets the retransfer flag in the register 112.

By the way, the HDD 24 includes a disk supporting/rotating mechanism that bears one platter or a plurality of platters and drives the platters so that the platters will rotate, one magnetic head or a plurality of magnetic heads that reads or writes a signal from or in the surface of each of the platters, and a head moving mechanism for moving the magnetic heads in the radial directions of the platters.

Reading or writing a signal from or in the recording surface of a disk is achieved in units of a block having a predetermined length equivalent to the size of a sector. Moreover, the HDD 24 has a protecting mechanism that uses a unique acceleration sensor to detect a possibility of undergoing an impact derived from dropping or the like or the impact itself, and that, if the acceleration exceeding a threshold is detected during data transfer, suspends the data transfer and moves the magnetic head to a position at which collision of the magnetic head with the surface of a disk can be avoided. Consequently, an error flag signifying that data transfer has failed is set in the register 114. The system controller 61 reads the contents of the register 114 incorporated in the HDD 24, and recognizes whether data transfer has succeeded or failed.

Methods of withdrawing the magnetic heat to a safe place include a contact start stop (CSS) method according to which the magnetic head is withdrawn to a field called a CSS zone on the surface of a disk and a loading/unloading method according to which the magnetic head is withdrawn into an inclined portion called a ramp located outside the outermost recording field on a disk.

Next, a transfer application to be installed in a personal computer (PC) in order to utilize the portable HDD video playback equipment 100 will be described below.

Figure 7:
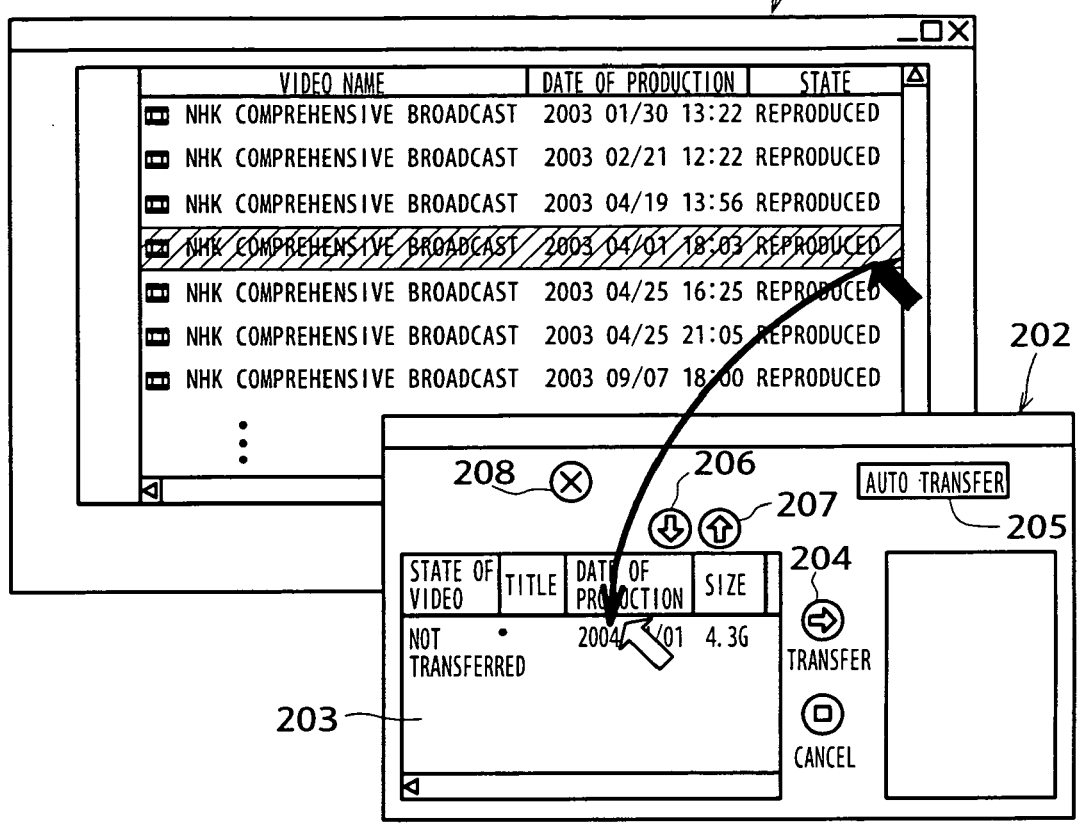
FIG. 7 shows a recording contents presentation window and a transfer window that are opened on a personal computer by a transfer application.

FIG. 7 shows a recording contents presentation window 201 that is opened on a PC by the transfer application. The recording contents presentation window 201 presents a list of video streams that are recorded in the PC or reserved for recording and that are arranged from up to down in order of their being recorded or reserved for recording. The list of video streams indicates the names of the video streams, the dates of production thereof, and the states thereof signifying whether the video streams have been recorded or not.

When a desired video stream must be transferred to the portable HDD video playback equipment 100, a transfer window 202 is invoked. A video stream listed in the recording contents presentation window 201 is dropped into a listing box 203, in which video streams to be transferred are listed, within the transfer window 202 by performing drag-and-drop or the like using a mouse. Consequently, information on the video stream is displayed in the listing box 203 in which the video streams to be transferred are listed. Thereafter, a Transfer button 204 within the transfer window 202 is designated by clicking a mouse button. If the portable HDD video playback equipment 100 is connected to the PC, transfer of the video stream from the PC to the portable HDD video playback equipment 100 is initiated immediately. When the Transfer button 204 is designated by clicking the mouse button, if the portable HDD video playback equipment 100 is not connected to the PC, as soon as the portable HDD video playback equipment 100 is connected to the PC, transfer of the video stream is initiated.

Various formats including Audio Video Interleaved (AVI) and Windows (registered trademark) Media Video (WMV) are known as file formats for video streams to be stored in a PC. The portable HDD video playback equipment 100 has specifications therefor defined so that video streams formatted according to the MPEG-2 standard can be decoded and reproduced. Before transferring a video stream from the PC to the portable HDD video playback equipment 100, the transfer application autonomously converts the format of the video stream to an MPEG-2-conformable format, and then transfers the video stream, which has been converted to be conformable to the MPEG-2 standard, from the PC to the portable HDD video playback equipment 100.

The actions to be performed in a case where a user manually transfers a desired video stream have been described. Since some of video contents have lengths of several gigabytes, a considerable time is presumably required for data transfer. For this reason, the transfer application has a transfer reservation feature. In order to employ the transfer reservation feature, an Auto Transfer button 205 within the transfer window 202 is designated by clicking the mouse button. A window for use in designating a time instant at which automatic transfer is initiated is then opened. A user enters a desired transfer start time instant and finalizes the entry. The transfer application preserves the user-designated transfer start time instant, and compares the time instant with a time instant indicated by a clock. When the designated time instant comes, the video streams presented in the listing box 203, in which video streams to be transferred are listed, within the transfer window 202 are transferred one by one from the PC to the portable HDD video playback equipment 100 after their formats are converted.

The video streams presented in the listing box 203, in which video streams to be transferred are listed, within the transfer window 202 are transferred orderly from the uppermost one. The order in which video streams are presented can be freely changed by clicking the mouse button within Change Rank buttons 206 and 207. Namely, after a video stream whose rank should be changed is selected by clicking the mouse button, the mouse button is clicked once within the Change Rank button 207. Consequently, the selected video stream ranks one step higher. On the contrary, when the mouse button is clicked once within the Change Rank button 206, the selected video stream ranks one step lower. After a video stream to be deleted is selected by clicking the mouse button, if the mouse button is clicked in a Delete button 208, the selected video stream is deleted from the listing box 203 in which video streams to be transferred are listed, and excluded from objects of transfer.

Figure 14:
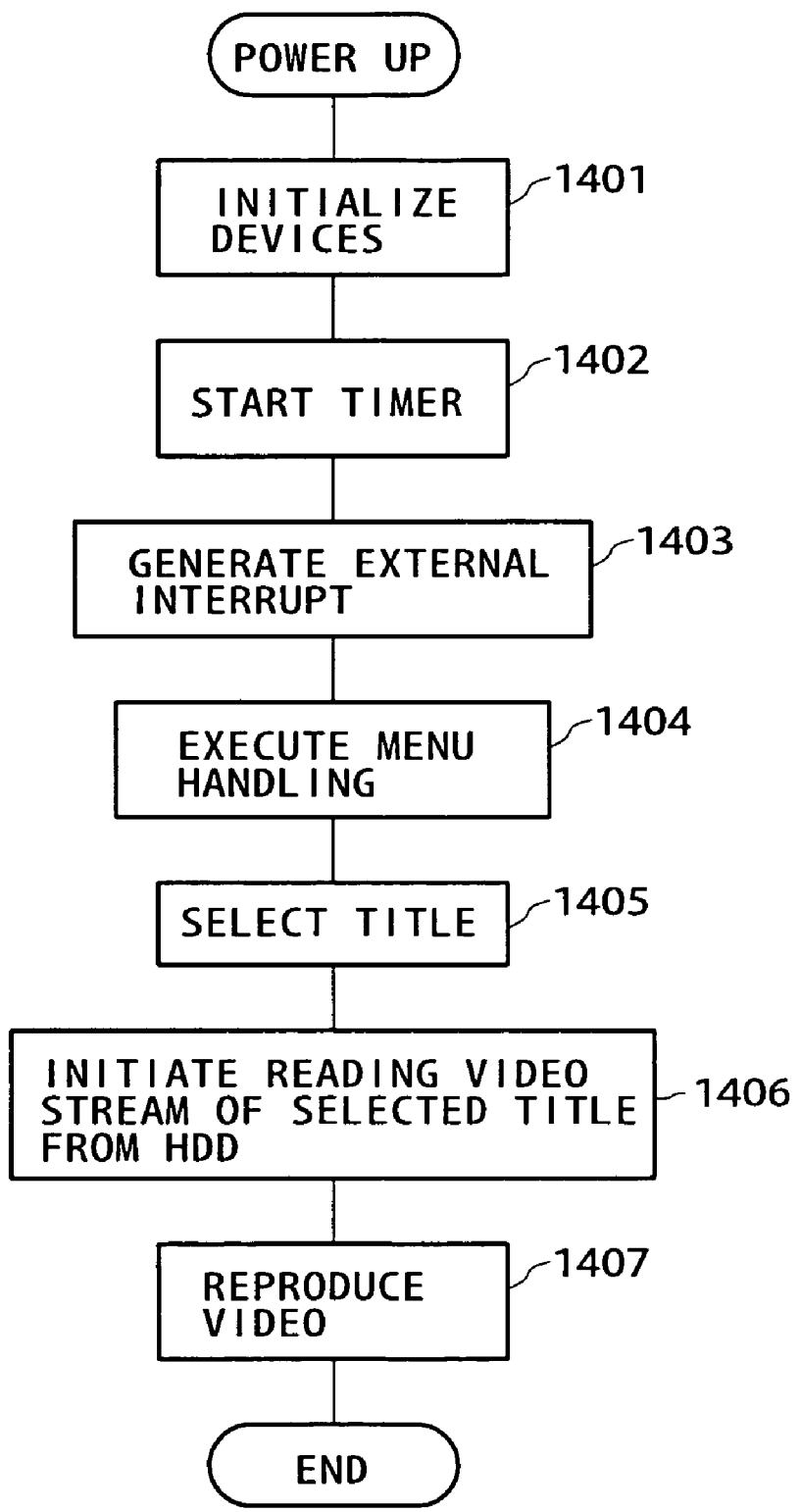
FIG. 14 describes a procedure from a step of turning on the power supply of the portable HDD video playback equipment to a step of initiating reproduction of video data.

Next, a way of operating the portable HDD video playback equipment 100 and operation screen images will be described below. FIG. 14 describes a procedure from the instant the power supply is turned on to the instant reproduction of a video is initiated.

When a user presses the Power key of the portable HDD video playback equipment 100, the system controller 61 detects the fact, and initializes devices according to the firmware stored in the ROM 73 (step 1401). Thereafter, a built-in timer is started (step 1402). Thereafter, a PC that is USB-compatible initiates transfer of a video stream to the portable HDD video playback equipment 100. When the transfer is completed, the portable HDD video playback equipment 100 receives a transfer completion notification as an external interrupt (step 1403). In response to the external interrupt, the portable HDD video playback equipment 100 initiates menu handling so as to produce and display a menu that is displayed on the screen (step 1404).

Figure 8:
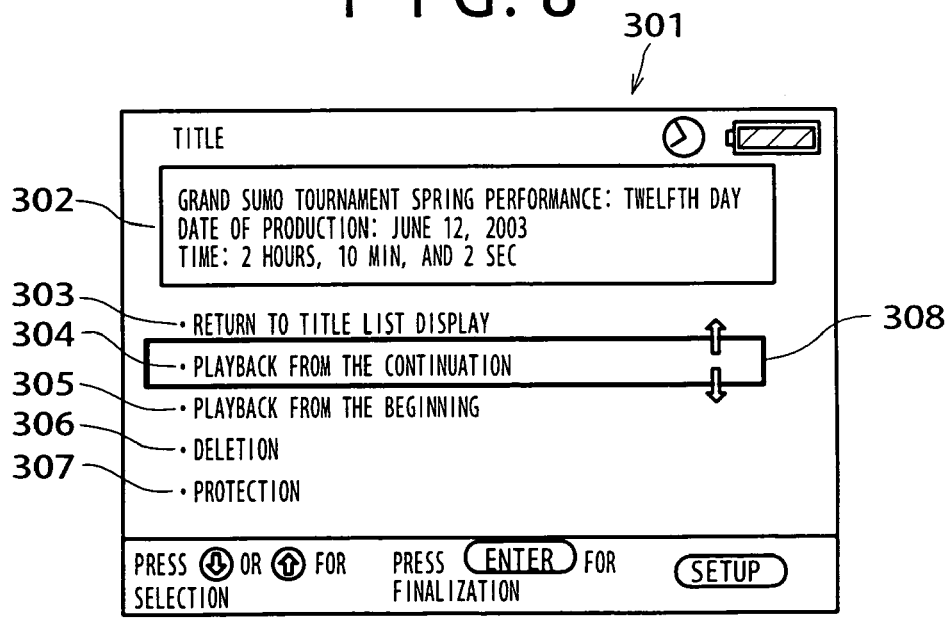
FIG. 8 shows an action menu.

First, an action menu 301 like the one shown in FIG. 8 is produced and displayed. The action menu 301 presents information 302 on a video stream reproduced last, which specifies the title name of the video stream, the date of production thereof, and the recording time thereof, as well as items 303 to 307 signifying optional actions. The optional actions include "Return to title list display," "Playback from the continuation," "Playback from the beginning," "Deletion," and "Protection." A highlight 308 is allocated to one of the items 303 to 307. A user manipulates the menu selection-related key 32 included in the key operating unit 3 so as to vertically shift the position of the highlight 308. The initial position of the highlight 308 is always the position of "Playback from the continuation." A video stream can be immediately enjoyed from a time instant, at which reproduction of the video stream has been suspended previously, without the necessity of shifting the position of the highlight 308. In other words, after the user starts up the system, when the action menu 301 is displayed, the user should merely press the Enter key 31 included in the key operating unit 3. Thus, the user can enjoy a video stream from a time instant at which reproduction of the video stream has been suspended previously.

Figure 9:
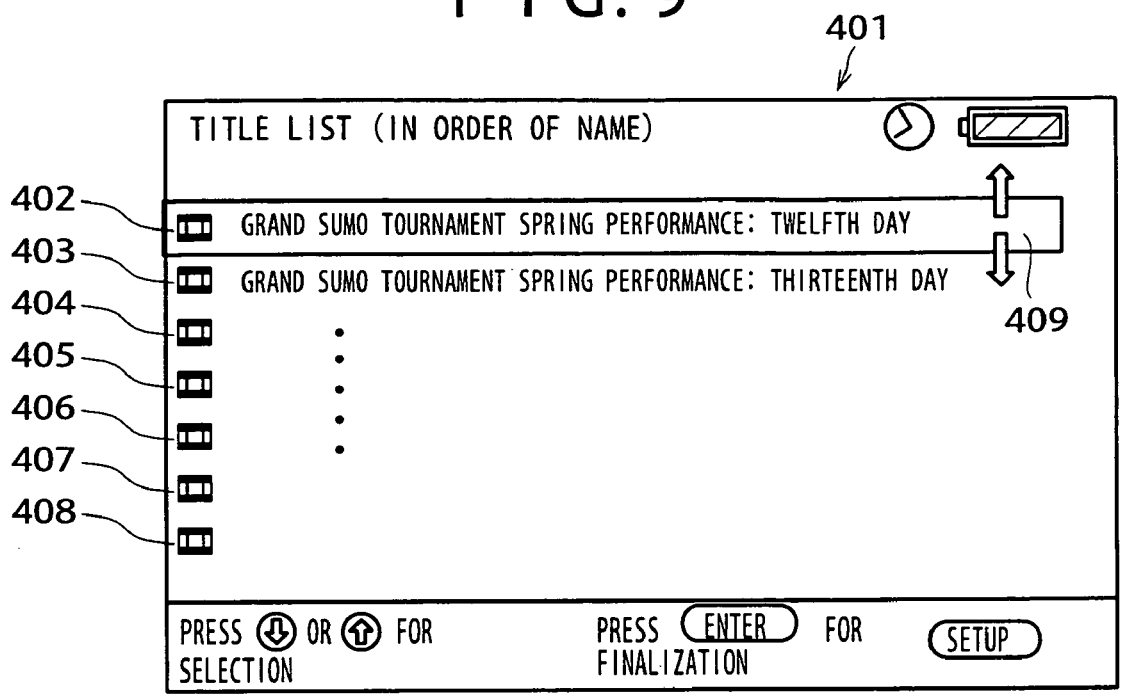
FIG. 9 shows a title list.

When the position of the highlight is shifted to the item "Return to title list display," if the Enter key 31 included in the key operating unit 3 is pressed, a title list 401 like the one shown in FIG. 9 is displayed on behalf of the action menu 301. The title list 401 presents items 402 to 408 signifying the titles of all video streams stored in the HDD 24 incorporated in the portable HDD video playback equipment 100. A highlight 409 is allocated to one of the items 402 to 408 signifying the titles. A user manipulates the menu selection-related key 32 included in the key operating unit 3 so as to freely vertically shift the position of the highlight 409. The initial position of the highlight 409 is the position of the title of a video stream reproduced last. The user can recognize the title of the video stream he/she has enjoyed last. The user manipulates the menu selection-related key 32 so as to move the highlight to the item of the title of a video stream in the title list 401 he/she wants to enjoy. The user then presses the Enter key 31. Thus, the user can enjoy another video stream.

Referring back to the flowchart of FIG. 14, when a user selects the title of a video stream he/she wants to enjoy (step 1405), reading the video stream of the title from the HDD 24 is initiated (step 1406). The video stream read from the HDD 24 is then reproduced (step 1407). Namely, the video stream read from the HDD 24 is transferred to the buffer memory 95 using a DMA channel, and then buffered. Thereafter, the video stream is transferred to the MPEG-2 decoder 89 using the DMA channel, and then decoded. The LCD controller 99 drives the LCD 21 on the basis of video data sent from the MPET-2 decoder 89. Consequently, a video is displayed on the screen of the LCD 21. On the other hand, audio data decoded by the MPEG-2 decoder 89 is converted into an analog signal by the D/A converter 101, and then transmitted to the headphone connected via the headphone terminal 10 (step 1407).

If a user selects the item 305 "Playback from the beginning" from the action menu 301, the video stream having been reproduced last is reproduced from the beginning.

If a user selects the item 306 "Deletion" from the action menu 301, the video stream having been reproduced last is deleted from the HDD 24. Namely, the video stream having been enjoyed is deleted from the HDD 24 by performing a small number of manipulations.

If a user selects the item 307 "Protection" from the action menu 301, a designated video stream stored in the HDD 24 is protected or inhibited from being deleted.

Figure 10:
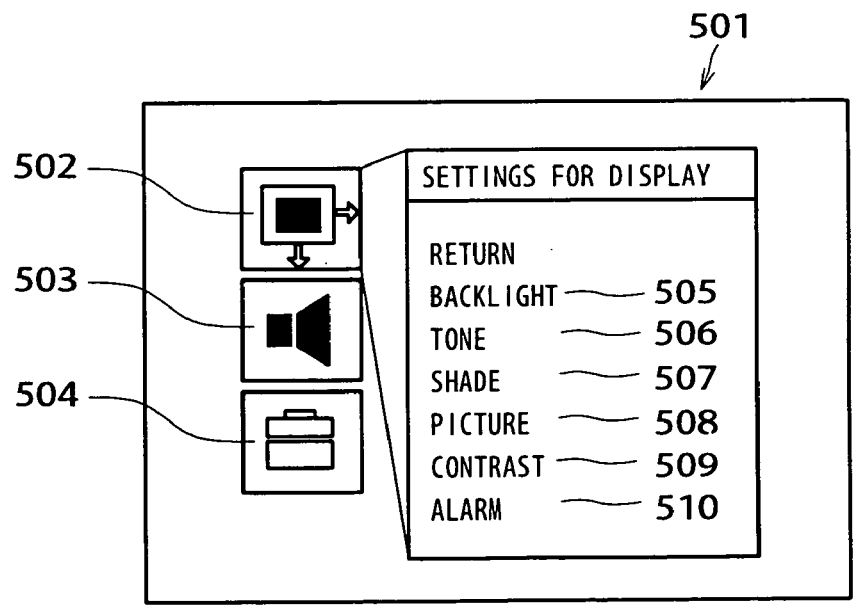
FIG. 10 shows an environment determination screen image.

Next, an environment determination screen image will be described below. FIG. 10 shows the environment determination screen image 501. The environment determination screen image 501 can be invoked by pressing, for example, the Setup button 41. The environment determination screen image 501 enables determination of various settings concerning display, an audio output, or the like. The environment determination screen image 501 presents a display-related icon 502, an audio output-related icon 503, and another icon 504. One of the icons 502 to 504 can be designated by moving a highlight using the menu selection-related key 32 and by pressing the Enter key 31. The settings for display include the luminance 505 of the backlight, a tone 506, a shade 507, a picture 508, a contrast 509, and an alarm 510. For selection of any of the items of settings, the menu selection-related key 32 is manipulated in order to move the highlight and the Enter key 31 is then pressed.

Figure 11:
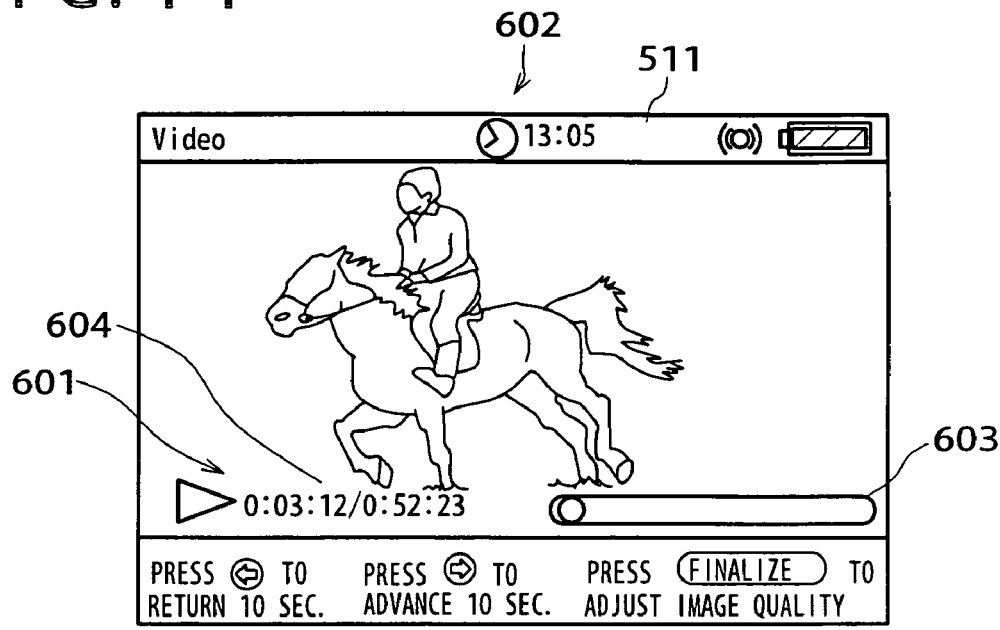
FIG. 11 shows a screen image presenting an elapsed (remaining) time for reproduction of a video stream.

What is referred to as the alarm 510 is a feature that a user sets a timer to a user-designated remaining time, the remaining time 511 is, as shown in FIG. 11, always presented as part of a screen image during reproduction of a video stream, and when the remaining time becomes null, for example, an alarm sound is given while being synthesized with an audio signal reproduced together with a video signal. Since characters signifying a time instant attained during broadcasting may be superimposed on a television broadcast, a user enjoying the video displayed on the portable HDD video playback equipment 100 may take the displayed time instant for a current time instant and miss his/her train station. When the alarm feature is utilized, the user will learn the elapse of a set time owing to the alarm sound while being enjoying a video content. The user is thus prevented from missing his/her train station.

FIG. 11 shows an example of a screen image 602 presenting an elapsed (remaining) time 601 for reproduction of a video stream. When, for example, the Display button 42 is pressed, the elapsed (remaining) time 601 for reproduction of a video stream is presented with a numerical value 604 and an image 603 on a video stream being reproduced.

Moreover, during reproduction of a video stream, quick playback, return, or increase or decrease in an audio volume can be designated by manipulating the playback-related key 33. As shown in FIG. 2, when the rightward position on the playback-related key 33 is pressed, quick playback is executed. When the leftward position thereon is pressed, return and playback is executed. When the rightward position on the playback-related key 33 that lies rightward relative to a user is pressed once, quick playback for a certain predefined time (for example, 15 sec) is executed. When the rightward position is held down for a certain time or longer, continuous quick playback is executed. Furthermore, after continuous quick playback is initiated, if the rightward position is held down for a certain time, the quick playback speed is increased. Specifically, the speed of initial continuous quick playback is 15 times higher than the speed of normal playback. The speed of initial continuous quick playback can be switched to a speed that is 60 times higher than the speed of normal playback.

Moreover, when the leftward position on the playback-related key 33 that lies leftwards relative to a user is pressed once, return and playback for a predetermined certain time (for example, 15 sec) is executed. When the leftward position is held down for a certain time or longer, continuous return and playback is executed. Furthermore, after continuous return and playback is initiated, when the leftward position is held down for a certain time, the speed of return is increased. Specifically, the initial speed of continuous return and playback is 15 times higher than the speed of normal return and playback, and then switched to a speed that is 60 times higher than it.

Next, a description will be made of a method of controlling data transfer from the HDD 24 to the buffer memory 95, which is performed in the portable HDD video playback equipment 100, according to an acceleration detected by the acceleration sensor 111 and the number of sectors measured by the amount-of-transferred data meter 113.

When a large amount of data such as a motion picture stream is continuously read, for example, when one video stream formatted according to the MPEG-2 standard is decoded and reproduced, data is read from every group of sectors including a predetermined number of sectors included in the HDD 24, and then transferred to the buffer memory 95.

Figure 16:
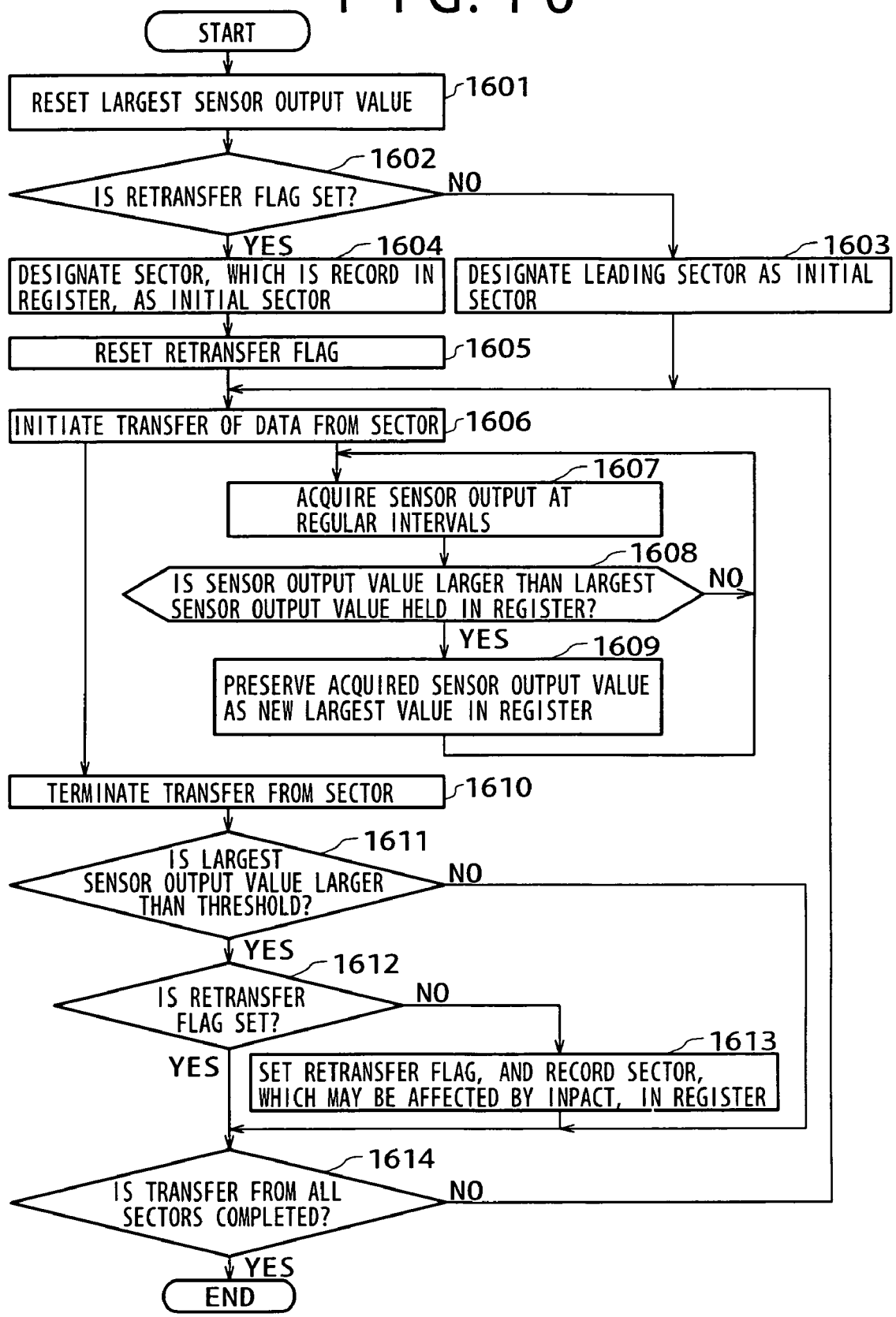
FIG. 16 is a flowchart describing a flow of data transfer from the HDD to the buffer memory in the first control mode.

FIG. 16 is a flowchart describing a flow for controlling transfer of data from one group of sectors.

Prior to initiation of data transfer from the HDD 24 to the buffer memory 95, the system controller 61 first resets the largest value assumed by an output of the acceleration sensor and held in the register 112 (step 1601). Thereafter, the system controller 61 reads the retransfer flag in the register 112 (step 1602). If the retransfer flag is not set, the leading sector included in a group of sectors from which data will be transferred next is designated as an initial sector (step 1603). The system controller 61 then controls the DMA transfer circuit 87 so that the DMA transfer circuit 87 will initiate transfer of data from the sectors belonging to the group of sectors (step 1606). Moreover, if the retransfer flag is set, the system controller 61 designates a sector, which is recorded in the register 112 and in which data supposed to be transferred previously is stored, as an initial sector (step 1604), and then resets the retransfer flag (step 1605). Thereafter, the system controller 61 controls the DMA transfer circuit 87 so that the DMA transfer circuit 87 will initiate transfer from the sectors belonging to the group of sectors (step 1606). Incidentally, actions to be performed for preserving information on a sector in the register 112 will be described later.

During transfer of data from one group of sectors, the amount-of-transferred data meter 113 included in the DMA transfer circuit 87 counts the number of sectors in the HDD 24 from which data is transferred to the buffer memory 95, and notifies the system controller 61 of the result of the counting. Moreover, the system controller 61 fetches an output of the acceleration sensor 111 at regular intervals (step 1607), and preserves the largest value assumed by the output of the acceleration sensor in the register 112 (steps 1608 and 1609).

At step 1610, whether transfer from one sector belonging to the group of sectors is completed is detected. At step 1611, the system controller 61 checks the largest sensor output value preserved in the register 112 to see if it is larger than a threshold. If the largest sensor output value is equal to or smaller than the threshold, whether transfer from all the sectors belonging to the one group of sectors is completed is verified at step 1614. If transfer from all the sectors is not completed, processing returns to step 1606, and transfer from the next sector is initiated. If the largest sensor output value is larger than the threshold, the system controller 61 checks the retransfer flag in the register 112 at step 1612. If a transfer error flag is not set, the transfer error flag is set at step 1613. The count value indicating the number of sectors measured by the amount-of-transferred data meter 113 is checked to see if any sector may be affected by an impact derived from dropping or the like. The information on the sector is then written in the register 112.

Figure 15:
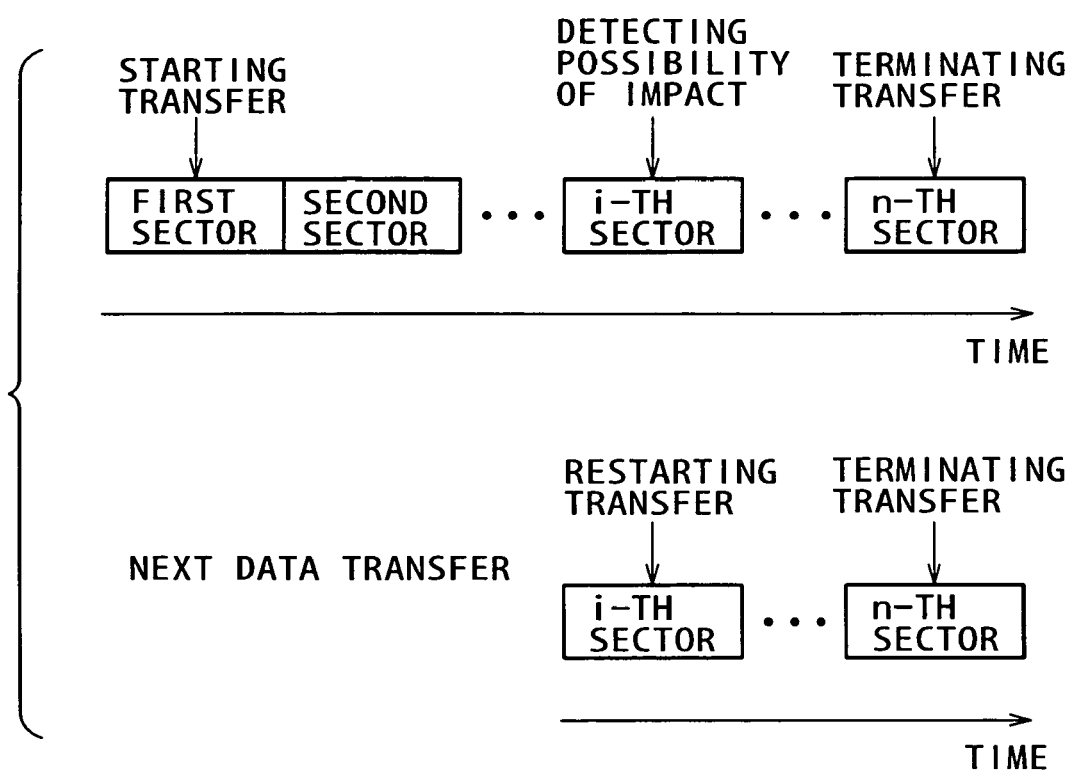
FIG. 15 shows an example of the timings of suspending and restarting data transfer from an HDD to a buffer memory.

The foregoing actions are repeated for transfer from each of sectors belonging to one group of sectors, information on a sector from which data is being transferred when the largest sensor output value exceeds the threshold for the first time during one data transfer from the one group of sectors is preserved in the register 112. For example, as shown in FIG. 15, assuming that data stored in a group of sectors stating with the first sector and ending with the n-th sector is transferred, if the largest sensor output value detected during transfer from the i-th sector is larger than the threshold, information on the i-th sector is written in the register 112.

Thereafter, the system controller 61 recognizes that an error flag signifying a failure in data transfer is set in the register 114 incorporated in the HDD 24, and then restarts data transfer, or the system controller 61 initiates the next data transfer. At this time, the system controller 61 learns that the retransfer flag is set in the register 112. The system controller 61 then designates a sector, which is recorded in the register 112 and in which some of data supposed to be transferred previously is stored, as an initial sector (step 1604). Consequently, data transfer is restarted from the sector, that is, a sector which may be affected by an impact derived from dropping or the like. Data transfer is repeated in order to transfer data from the remaining sectors belonging to the group of sectors. Consequently, one video stream formatted according to the MPEG-2 standard is reproduced.

As mentioned above, according to the portable HDD video playback equipment 100 of the present embodiment, if an error occurs due to an impact derived from dropping or the like during data transfer, data transfer is restarted from a sector that may be affected by the impact. Consequently, the data stored in the sectors preceding the sector need not be retransferred. This leads to improved efficiency in data transfer.

Figure 17:
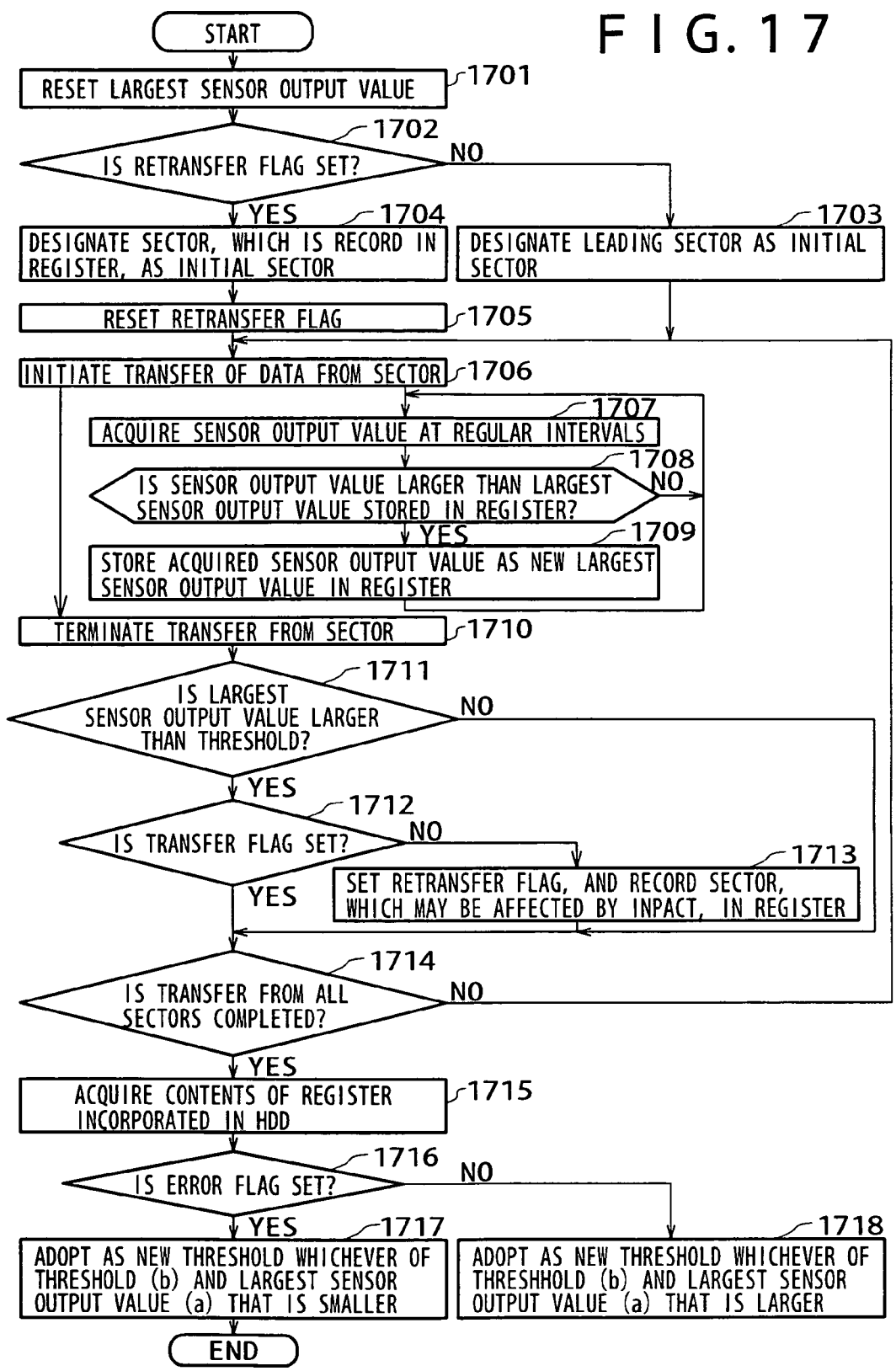
FIG. 17 is a flowchart describing a flow of data transfer from the HDD to the buffer memory in the second control mode.

Next, the second mode of the data transfer control will be described below. FIG. 17 is a flowchart describing a flow of controlling data transfer in the second mode.

The second data transfer control mode is characterized in that a threshold based on which the largest value assumed by an output of the acceleration sensor is assessed is optimized.

Prior to data transfer from the HDD 24 to the buffer memory 95, the system controller 61 first resets at step 1701 the largest value assumed by an output of the acceleration sensor and recorded in the register 112. Thereafter, at step 1702, the system controller 61 reads the retransfer flag in the register 112. If the retransfer flag is not set, the leading sector of a group of sectors from which data will be transferred next is designated as an initial sector at step 1703. At step 1706, the system controller 61 controls the DMA transfer circuit 87 so that the DMA transfer circuit 87 will initiate transfer of data from the sectors belonging to the group of sectors. Moreover, if the retransfer flag is set, the system controller 61 designates a sector, which is recorded in the register 112, as an initial sector at step 1704. At step 1705, the retransfer flag is reset. Thereafter, the system controller 61 controls the DMA transfer circuit 87 so that the DMA transfer circuit 87 will initiate transfer of data from the sectors belonging to the group of sectors at step 1706.

During transfer of data from one group of sectors, the amount-of-transferred data meter 113 included in the DMA transfer circuit 87 counts the number of sectors in the HDD 24, from which data is transferred to the buffer memory 95, and notifies the system controller 61 of the result of the counting. Moreover, the system controller 61 fetches an output of the acceleration sensor 111 at regular intervals (step 1707), and preserves in the register 112 the largest value assumed by the output of the acceleration sensor (steps 1708 and 1709).

At step 1710, completion of transfer of data to one sector belonging to the group of sectors is detected. At step 1711, the system controller 61 checks the largest value, which is assumed by the output of the acceleration sensor and preserved in the register 112, to see if the largest sensor output value is larger than a threshold. If the largest sensor output value is equal to or smaller than the threshold, transfer of data from the next sector belonging to the group of sectors is initiated at step 1706. If the largest sensor output value is larger than the threshold, the system controller 61 checks the retransfer flag in the register 112 at step 1712. If the transfer error flag is not set, the transfer error flag is set at step 1713. Moreover, the count value indicating the number of sectors measured by the amount-of-transferred data meter 113 is checked to see if any sector may be affected by an impact derived from dropping or the like. Information on the sector is then written in the register 112.

The foregoing actions are repeated for transfer of data from each of sectors belonging to one group of sectors. Finally, information on a sector to which data is being transferred when the largest sensor output value exceeds the threshold for the first time during one data transfer to one group of sectors is preserved in the register 112.

Thereafter, the system controller 61 acquires the contents of the register 114 incorporated in the HDD 24 at step 1715. At step 1716, the system controller 61 verifies whether the error flag signifying a failure in data transfer is set. If the error flag is set, the threshold (b) and the largest sensor output value (a) that are stored in the register 112 are compared with each other at step 1718. Whichever of the values that is smaller is adopted as a new threshold. Namely, when the largest sensor output value (a) is smaller than the threshold (b), the largest sensor output value (a) is specified as a new threshold. If the largest sensor output value (a) is equal to or larger than the threshold (b), the current threshold (b) is employed as it is.

On the other hand, if the error flag is not set, whichever of the threshold (b) and the largest sensor output value (a) that is larger is adopted as a new threshold at step 1718. For example, if the largest sensor output value (a) is larger than the threshold (b), the largest sensor output value (a) is specified as a new threshold. If the largest sensor output value (a) is equal to or smaller than the threshold (b), the current threshold (b) is employed as it is.

Consequently, the next subsequent data transfers can be controlled based on an optimal threshold based on which a possibility that the HDD 24 may be affected by an impact derived from dropping or the like can be assessed more precisely.

The present invention is not limited to the aforesaid embodiment but can be modified in various manners without a departure from the gist of the present invention.

The foregoing embodiment is the equipment adopting an HDD as a large-capacity data recording device. The present invention is not limited to the equipment but may be applied to equipment adopting any of other various data recording devices, data transfer from which may be adversely affected by an impact, including a magnetic recording type data recording device as well as an optical data recording device and a magneto-optical recording type data recording device.

According to the aforesaid embodiment, every group of sectors is checked for a sector that may be affected by an impact derived from dropping or the like, and data transfer is restarted from the sector. Alternatively, every group of clusters including a plurality of clusters may be checked for a cluster that may be affected by an impact derived from dropping or the like.

Moreover, the size of a block of data to be transferred is not limited to the size of a sector or a cluster but may be set to any amount of data.

In the aforesaid embodiment, data to be transferred from the HDD 24 is data formatted as a video stream. Alternatively, audio data or any other data will do.

What is claimed is:

1. An information processor comprising:
   a data recorder configured to store data;
   a meter configured to measure in real time an amount of data transferred from said data recorder to generate a measurement of transferred data;
   a detector configured to detect an acceleration value;
   a block identifier configured to identify a transferred block of data according to the measurement of transferred data performed by said meter when the acceleration value sent from said detector exceeds a threshold;
   a block information holder configured to hold information on the transferred block identified by said block identifier generating a recorded block;
   a controller configured to control data transfer so that data transfer will be restarted with the recorded block that is recorded in said block information holder.

2. The information processor according to claim 1, wherein said data recorder includes an intra-recorder detector configured to detect an updated acceleration value and an error handler configured to suspend transfer of data from the intra-recorder according to a detection performed by said intra-recorder detector, and configured to transmit an error signal, said information processor further comprising:
   a largest value holder configured to compare and hold the larger value of the updated acceleration value sent from said intra-recorder detector;
   an updating unit configured so that: after data transfer is completed, if said data recorder transmits said error signal, said updating unit is configured to update said threshold with the smaller of said updated acceleration value or said threshold, and if said error signal is not transmitted, said updating unit is configured to update said threshold with the larger of said updated acceleration value or said threshold.

3. A data transfer method comprising:
   transferring data from a data storage to a memory: measuring, in real time, during the transferring, an amount of data whose transfer is completed;
   detecting a detected acceleration value;
   determining when the detected acceleration value exceeds a threshold; identifying a transferred block based on the measuring; and
   restarting the transferring based on the transferred block.

4. The data transfer method according to claim 3, further comprising: suspending the transferring according to the determining and the detected acceleration value; and
   transmitting an error signal;
   acquiring an updated detected acceleration value at regular intervals;
   wherein after transferring is completed, if said transmitting said error signal has occurred, updating said threshold with the smaller of said updated detected acceleration value or said threshold; and
   if said transmitting said error signal has not occurred, updating said threshold with the larger of said updated detected acceleration value or said threshold.

5. An information processor comprising:
   a data recorder configured to store data encoded according to a predetermined format;
   a decoder configured to decode said data;
   a memory configured to store part of said data to be transferred to said decoder;
   a transfer section configured to transfer said data from said data recorder in units of a group of blocks comprising a predetermined number of blocks, and configured to transfer said data to said memory;

a meter configured to measure in real time a transferred data measurement of an amount of data transferred from said data recorder to said memory;

a detector configured to detect an acceleration value;

a block identifier configured to identify a block of data transferred when the acceleration value which said detector detects based on the result of the transferred data measurement performed by said meter exceeds a threshold;

a block information holder configured to hold information on said block identified by said block identifier; and a controller configured to control so that said transfer section restarts transferring of said data with said block identified by said block identifier, which is recorded in said block information holder, after said transfer section completes transferring said group of blocks.

6. An information processing method comprising:

reading data, which is encoded according to a predetermined format, from a data recorder, in which said data is stored, in units of a group of blocks comprising a predetermined number of blocks, and transferring said data to a memory;

measuring in real time an amount of data transferred from said data recorder to said memory;

detecting an acceleration value;

identifying a block of data transferred when the acceleration value detected based on said measuring exceeds a threshold;

wherein after completing the transferring of said group of blocks to said memory, restarting transferring with said identified block; and decoding said data stored in said memory.

* * * * *